June 30, 1931.  W. H. CATER  1,812,471
GUIDE BEARING
Filed May 3, 1929
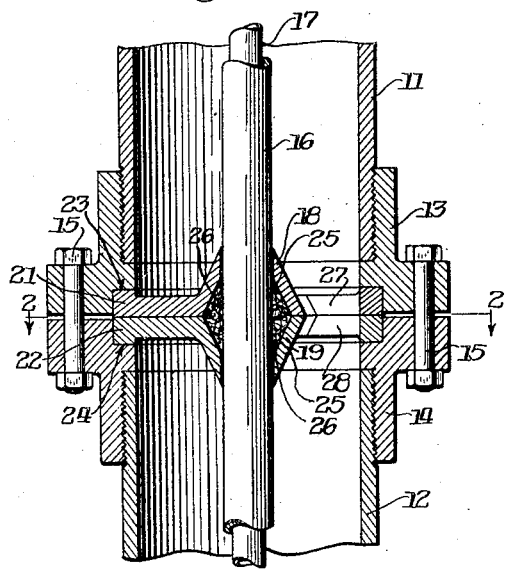
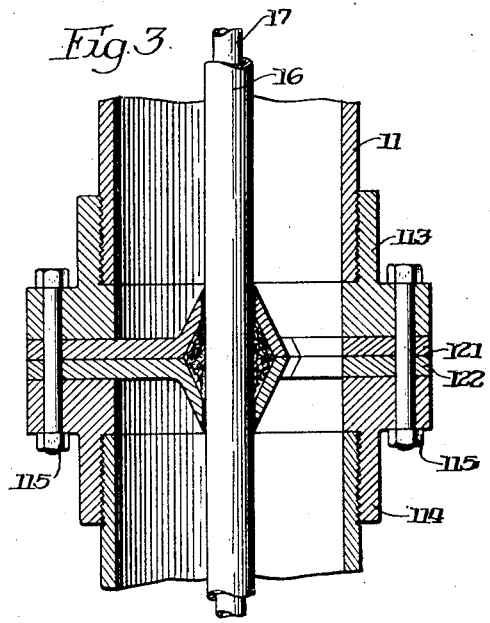
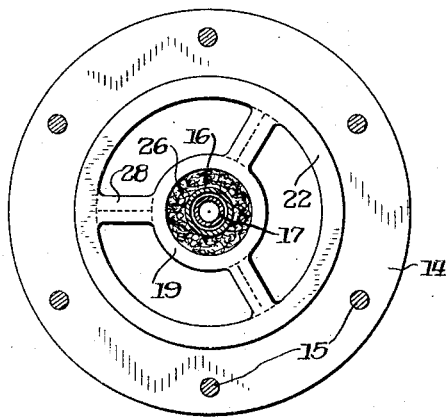
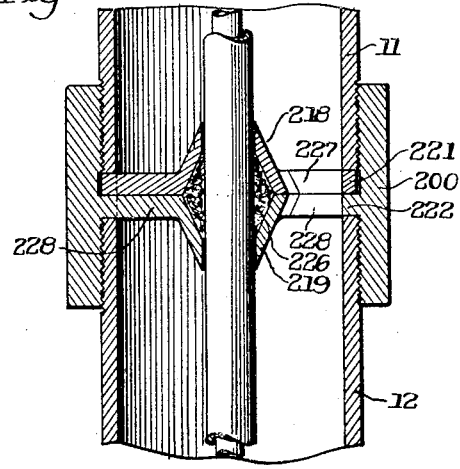
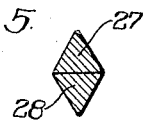
Inventor:
William H. Cater
By Walter M. Fuller
Atty.

Patented June 30, 1931

1,812,471

UNITED STATES PATENT OFFICE

WILLIAM H. CATER, OF CHICAGO, ILLINOIS

GUIDE-BEARING

Application filed May 3, 1929. Serial No. 360,147.

My invention relates to novel and advantageous structural means for positioning, guiding, or holding the pipes of wells and to prevent excessive damage to such pipes by the creation of water eddies and currents which tend to wear the pipes rapidly unless effective means are provided to avoid or overcome such objectionable results.

To enable those skilled in this art to understand the invention adequately, both from structural and functional standpoints, I have illustrated a plurality of embodiments of the same in the accompanying drawings, forming a part of this specification, and, in which, for the sake of simplicity, like reference numerals have been used to characterize the same or like elements throughout the several views.

In these drawings:—
Figure 1 is a fragmentary, central, longitudinal section through the well piping showing one form of the present invention;

Figure 2 is a horizontal or cross section on line 2—2 of Figure 1;
Figure 3 is a view similar to that of Figure 1 of a somewhat modified construction;

Figure 4 is an analogous view of another species of the invention; and

Figure 5 is a vertical section through one of the spider arms of any of the three forms of structure, for example, that depicted in Figure 1.

Referring first to the style of construction shown in Figures 1 and 2, it will be noted that the adjacent, aligned sections 11 and 12 of the stationary, column pipe have their threaded ends screwed into mating or companion flanges 13 and 14 which are fastened securely together by any appropriate number of bolts 15, 15 extended through registering apertures therein.

The structure includes also a central, upright, revoluble shaft 17 which drive the impeller of the pump, such shaft being enclosed within an encasing pipe 16, the latter being provided at intervals with suitable guide bearings or positioning means, only one of which is presented in Figures 1 and 2.

Such guide-bearing comprises a pair of members 18 and 19 whose ring peripheries 21, 22 bear on one another and are clamped together by occupying mating, internal, annular recesses 23 and 24 in the flange elements 13 and 14.

The central portion of each of these two, reversely-arranged, associated parts 18 and 19 is tapered as shown, and, internally, it has a somewhat-conical cavity 25 through which the pipe 16 and its enclosed shaft 17 extend.

Such two, reversely-tapering cavities 25, 25 accommodate a suitable rubber or other appropriate packing or filler 26, which, as the two elements 18 and 19 are clamped together, is squeezed or wedged firmly inwardly to securely grasp and hold the pipe in position.

If the pipe is not exactly centrally located, the filler will yield sufficiently so that the pipe will not be materially displaced from the position which it naturally and normally assumes, and yet such filler will firmly and substantially evenly grasp the pipe to hold it properly in position, it being understood that the central apertures through the members 18 and 19 are slightly larger than the external diameter of the pipe which occupies them.

The central part of member 18 and its ring 21 and the corresponding elements 19 and 22 are connected together by spider arms 27 and 28, respectively, the contacting faces of such arms being flat and smooth as is clearly shown in Figure 5.

The upper face of each arm 27 tapers upwardly to almost a sharp edge and the under surface of each corresponding lower arm 28 is similarly tapered downwardly, the aim or purpose of such form being to offer minimum resistance to the water travelling upwardly between the pipes and arms and to eliminate or reduce the production of water eddies, whirlpools or vortexes, particularly near the top of the upper arms, which, if permitted to occur, can comparatively readily wear holes through the inner pipe.

Turning to the form of structure shown in Figure 3, it will be noted that this is substantially like that of Figure 1, except that the ring sections 121, 122 of the guide-bearing member are flat and extend outwardly to the margins of the companion flange elements 113 and 114, the bolts 115, 115 in this instance occupying registering holes in all four members, as is fully depicted. Otherwise the two structures are alike and operate in the same manner.

With reference to the appliance shown in Figure 4, the two pipe sections 11 and 12 are screwed into the opposite ends of a coupling 200 which has integral therewith the tapered guide-bearing member 219 and its spider arms 228.

The other portion of the guide-bearing comprises a converging section 218, radiating spider-arms 227, and a marginal ring, the latter being clamped between the end of the pipe 11 and the adjacent, internal, ring portion 222 of the coupling member.

As in the previous instances, the rubber or other suitable packing or filling material 226 is employed.

Those trained in this art will readily understand that the invention is susceptible of a variety of other embodiments and that it is not necessarily limited and restricted to the precise and exact structural details illustrated and described, the scope of the invention being defined by the appended claims.

I claim:

1. The combination of a sectional column-pipe, a coupling joining said sections together, a well-pipe in said column-pipe, and a guide-bearing for said well-pipe comprising a pair of apertured reversely-arranged clamping-members with mating oppositely-flaring recesses through which the well-pipe extends, and a packing in said recesses designed to be wedged around said well-pipe upon movement of said members toward one another, said pipe coupling holding said clamping-members together and with the packing wedged around said well-pipe.

2. The combination of a sectional column-pipe, a coupling joining said pipe sections together, a well-pipe in said column-pipe, and a guide-bearing comprising a pair of apertured clamping-members through the apertures of which the well-pipe extends, one at least of said members having a flaring recess surrounding said well-pipe, and a packing in said recess wedged around said pipe upon movement of said members toward one another, said pipe coupling holding said clamping-members together and the packing wedged around said well-pipe.

3. The combination of a sectional column-pipe, a coupling joining said pipe sections together, a well-pipe in said column-pipe, and a guide-bearing for said well-pipe comprising a pair of members centrally apertured in alignment through which apertures said well-pipe extends, each of said members having a marginal ring connected to a centrally apertured portion by a plurality of spider arms in register with the corresponding spider arms of the other member, the top and bottom surfaces of said mating arms diverging and converging respectively to reduce eddies in the liquid flowing between said arms.

4. The combination of a sectional column-pipe, a coupling joining said pipe sections together, a well-pipe in said column-pipe, and a guide-bearing for said well-pipe comprising a pair of apertured reversely-arranged clamping-members with mating oppositely-flaring recesses through which the well-pipe extends, each of said members having a marginal ring connected to its apertured portion by a plurality of spider arms in register with the corresponding spider arms of the other member, the top and bottom surfaces of said mating arms diverging and converging respectively to reduce eddies in the liquid flowing between said arms, and a packing in said recesses wedged around said well-pipe upon movement of said members toward one another, said pipe coupling holding said clamping-members together and the packing wedged around said well-pipe.

In witness whereof I have hereunto set my hand.

WILLIAM H. CATER.